A. HAINES.
MACHINE FOR MAKING STEEL AND COPPER WIRE CONNECTIONS.
APPLICATION FILED NOV. 11, 1910.

1,004,779.

Patented Oct. 3, 1911.
2 SHEETS—SHEET 1.

WITNESSES:

INVENTOR:
Albert Haines,
By
ATTORNEYS

A. HAINES.
MACHINE FOR MAKING STEEL AND COPPER WIRE CONNECTIONS.
APPLICATION FILED NOV. 11, 1910.
1,004,779.
Patented Oct. 3, 1911.
2 SHEETS—SHEET 2.
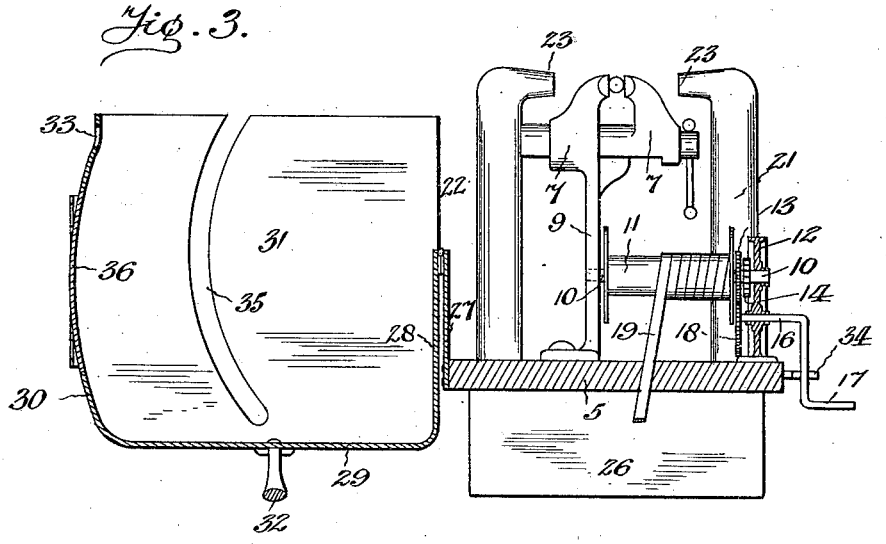
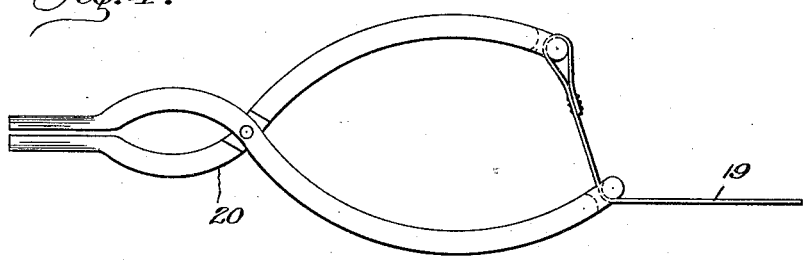
WITNESSES:
INVENTOR:
Albert Haines,
By
ATTORNEYS

UNITED STATES PATENT OFFICE.

ALBERT HAINES, OF WAUKEGAN, ILLINOIS, ASSIGNOR OF ONE-HALF TO LEW A. HENDEE, OF WAUKEGAN, ILLINOIS.

MACHINE FOR MAKING STEEL AND COPPER WIRE CONNECTIONS.

1,004,779. Specification of Letters Patent. Patented Oct. 3, 1911.

Application filed November 11, 1910. Serial No. 591,879.

*To all whom it may concern:*

Be it known that I, ALBERT HAINES, a citizen of the United States, residing at Waukegan, in the county of Lake and State of Illinois, have invented certain new and useful Improvements in Machines for Making Steel and Copper Wire Connections, of which the following is a specification.

My present invention relates to machines for making connections in broken steel and copper wires, my object being to provide a portable device which will be strong and compact and with which connections may be made by inexperienced persons.

Figure 1:
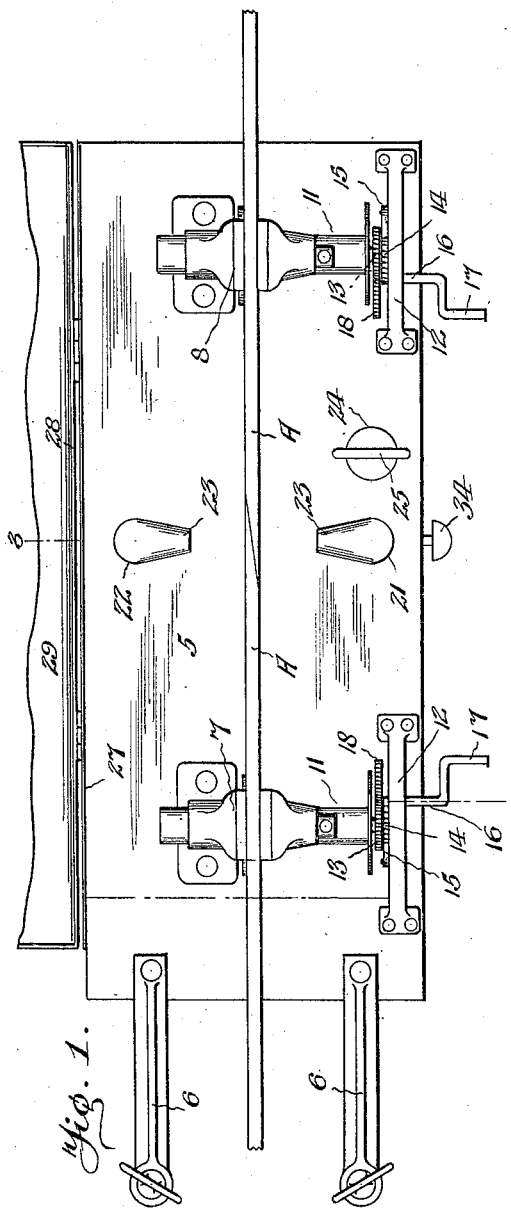
Figure 2:
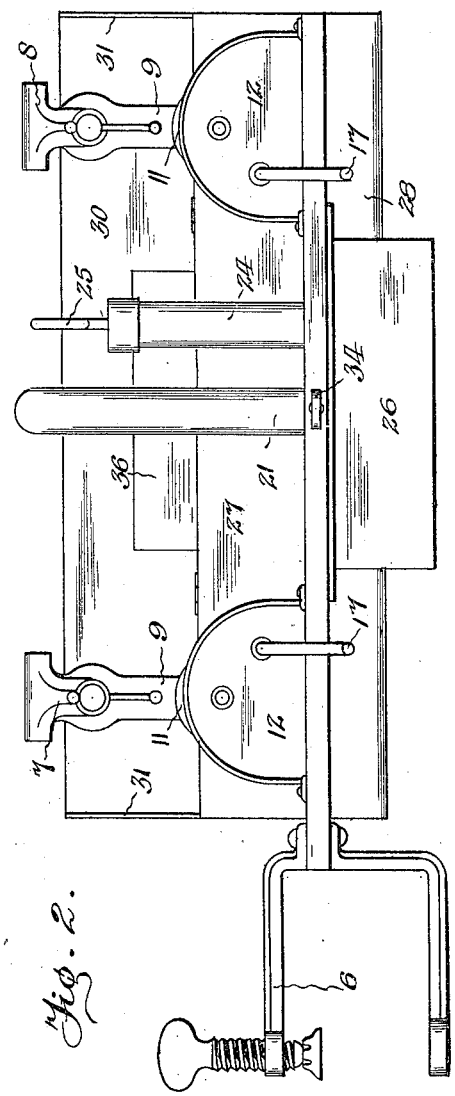

With this in mind my invention resides in the combination shown in the accompanying drawing, in which, Figure 1 is a plan view with the cover swung back and partly broken away. Fig. 2 is a front elevation of the same. Fig. 3 is a transverse vertical section taken on line 3—3 of Fig. 1, and Fig. 4 is an elevation of one of the "come-alongs."

Referring now to these figures, my invention comprises a base plate 5 having at one end clamps 6 by which said plate may be secured upon a suitable support, for instance the cross arm of a telephone or telegraph pole. Mounted at substantially central points of the plate 5, adjacent the ends thereof, are small vises 7 and 8, the vertical support 9 of each of which has a transverse opening forming a bearing for one end of a shaft 10 on which is secured a winding drum 11, the opposite end of said shaft 10 being journaled in a frame 12 secured at the forward edge of the base plate. Forwardly of its drum 11, each of the shafts 10 carries a small pinion 13 and a ratchet wheel 14, the latter of which is constantly engaged by a pawl or dog 15 pivoted upon the inner surface of its respective frame 12, so as to prevent rotation of the drum except in a direction toward the opposite drum. Journaled through each of the frames 12, is a second shaft 16, the outer end of which is bent to form a crank 17 and the inner end of which carries a pinion 18 in mesh with the pinion 13 of the drum shaft 10. Secured to each of the drums 11, to be wound thereabout upon rotation of the crank 17 in one direction, is a flat wire or band 19, shown in Fig. 3, to the outer end of which is affixed a "come-along" 20, shown in Fig. 4, to be attached to the respective end of a broken wire. In this manner the ends of a wire A may be drawn up and clamped in the vises 7 and 8 with the ends, previously beveled, in contact.

Extending upwardly from the base plate 5 are transversely alined blow pipes 21 and 22, located adjacent the forward and rear edges of said plate respectively, and at points substantially midway between the vises 7 and 8. These pipes have upper angular discharge spouts 23 turned toward one another and at a height corresponding to that of the wire A when clamped in the vises. The pipes 21 and 22 and also a small pump 24 having a plunger and handle 25, communicate, through the base plate 5 with a fuel tank 26, secured upon the lower surface of said plate, by which means heat may be directed against the ends of the wire A to be connected, after said wire has been clamped in position, as previously described.

Secured along the rear edge of the base plate 5 is an upstanding strip 27, to the upper edge of which is hinged the lower edge of the rear side 28 of the cover, which comprises also a top 29, front side 30 and ends 31, and may be provided with a handle 32 in order that the entire device may be carried from place to place. The lower edge of the front side 30 has a central slotted opening 33 through which the turn-button 34 mounted in the front edge of the base plate 5 may be locked when the cover is closed, and the cover ends 31 have slots 35 to receive the wire A. In this manner the cover may be closed, when the heat is directed against the ends of the wire, to protect the device in bad weather, and in this position, the hinged door 36 in the center of the front cover side 30, may be open to permit of the insertion of pliers to clamp the wire ends together.

Connections of the present character, which are made with brass or silver and borax, form solid joints and are much superior to the usual twisted joints.

I claim:

In a machine for making wire connections, the combination of a portable frame having clamps to secure the same upon a suitable support, means carried by said frame to draw together and hold the broken ends of a wire, means also carried by said frame to direct heat against the wire ends, and a cover for said frame and the parts carried thereby.

In testimony whereof, I affix my signature in presence of two witnesses.

ALBERT HAINES.

Witnesses:
J. R. BULLOCK,
A. L. HENDEE.

Copies of this patent may be obtained for five cents each, by addressing the "Commissioner of Patents, Washington, D. C."